(12) United States Patent
Bae et al.

(10) Patent No.: US 8,375,810 B2
(45) Date of Patent: Feb. 19, 2013

(54) STATOR ASSEMBLY AND TORQUE MEASURING DEVICE

(75) Inventors: Sung Kyu Bae, Ansan-si (KR); Chang Hwan Lee, Gyeongsan-si (KR)

(73) Assignee: LG Innotek Co., Ltd., Seoul (KR)

( * ) Notice: Subject to any disclaimer, the term of this patent is extended or adjusted under 35 U.S.C. 154(b) by 352 days.

(21) Appl. No.: 12/677,466

(22) PCT Filed: Sep. 10, 2008

(86) PCT No.: PCT/KR2008/005352
§ 371 (c)(1),
(2), (4) Date: Mar. 10, 2010

(87) PCT Pub. No.: WO2009/035266
PCT Pub. Date: Mar. 19, 2009

(65) Prior Publication Data
US 2010/0319466 A1    Dec. 23, 2010

(30) Foreign Application Priority Data
Sep. 10, 2007  (KR) .................... 20-2007-0015057 U

(51) Int. Cl.
*G01L 3/00* (2006.01)
(52) U.S. Cl. .................................. 73/862.334
(58) Field of Classification Search ............ 73/862.331–862.338
See application file for complete search history.

(56) References Cited

U.S. PATENT DOCUMENTS

| | | | |
|---|---|---|---|
| 4,972,109 A * | 11/1990 | Kakizaki et al. ........... 310/49.12 |
| 5,121,017 A * | 6/1992 | Yamamoto et al. ........ 310/49.12 |
| 6,909,208 B2 * | 6/2005 | Suzuki et al. .............. 310/49.13 |
| 6,912,923 B2 * | 7/2005 | Froehlich et al. ........ 73/862.333 |
| 7,406,884 B2 * | 8/2008 | Jerems et al. ............ 73/862.331 |
| 7,644,635 B2 | 1/2010 | Prudham et al. |
| 7,723,878 B2 * | 5/2010 | Yagai et al. ..................... 310/71 |
| 2002/0189371 A1 | 12/2002 | Nakane et al. |

(Continued)

FOREIGN PATENT DOCUMENTS

| CN | 101002078 A | 7/2007 |
|---|---|---|
| EP | 1752749 A1 | 2/2007 |

(Continued)

OTHER PUBLICATIONS

Office Action dated Mar. 23, 2012 in Japanese Application No. 2010-524780, filed Sep. 10, 2008.

(Continued)

*Primary Examiner* — Lisa Caputo
*Assistant Examiner* — Octavia Davis-Hollington
(74) *Attorney, Agent, or Firm* — Saliwanchik, Lloyd & Eisenschenk

(57) ABSTRACT

Disclosed are a stator assembly and a torque assembly device. The stator assembly includes a stator holder, a first stator which includes a first body making contact with an upper end of the stator holder and a plurality of first teeth extending from the first body so as to be disposed inside the stator holder, a second stator which includes a second body making contact with a lower end of the stator holder and a plurality of second teeth extending from the second body so to be alternately aligned with the first teeth inside the stator holder, and a fusion-welded material that is fusion-welded to the stator holder and the first and second bodies.

13 Claims, 5 Drawing Sheets

U.S. PATENT DOCUMENTS

| | | |
|---|---|---|
| 2003/0167857 A1 | 9/2003 | Sugimura et al. |
| 2004/0060766 A1 | 4/2004 | Hayakawa et al. |
| 2004/0074314 A1* | 4/2004 | Nakane et al. ........... 73/862.331 |
| 2007/0157740 A1 | 7/2007 | Jerems et al. |

FOREIGN PATENT DOCUMENTS

| | | |
|---|---|---|
| JP | 2003-149062 A | 5/2003 |
| JP | 2004-093183 A | 3/2004 |
| JP | 2004-125627 A | 4/2004 |
| JP | 2005-098821 A | 4/2005 |
| JP | 2007-040789 A | 2/2007 |
| KR | 10-2008-0006308 A | 1/2008 |
| KR | 10-2009-0004289 A | 1/2009 |

OTHER PUBLICATIONS

Patent Certificate for Invention issued on Jun. 13, 2012 in Chinese Application No. 200880113157.8, filed Sep. 10, 2008.

* cited by examiner

STATOR ASSEMBLY AND TORQUE MEASURING DEVICE

CROSS-REFERENCE TO RELATED APPLICATIONS

This application is the U.S. national stage application of International Patent Application No. PCT/KR2008/005352, filed Sep. 10, 2008, which claims priority to Korean Application No. 20-2007-0015057, filed Sep. 10, 2007, the disclosures of each of which are incorporated herein by reference in their entirety.

TECHNICAL FIELD

The present embodiment relates to a stator assembly and a torque measuring device.

BACKGROUND ART

Since great frictional resistance is applied to a front wheel serving as a steering wheel, a power steering system provides assistant steering force to allow a driver to smoothly manipulate a steering handle. The assistant steering force is determined by measuring torque applied to a torsion bar when the steering handle is steered.

In order to measure torque of the steering wheel, various torque measuring devices have been developed and used. Among them, a torque measuring device employing a magnetic field has been mainly used since it has advantages in terms of a number of parts and price.

In the torque measuring device employing the magnetic field, a magnet is coupled to a steering handle that is an input shaft, one side of a stator holder fixing a stator is coupled to the input shaft through the torsion bar, and the other side of the stator holder is coupled to an output shaft of a front wheel.

Accordingly, when rotating the steering handle by applying external force to the steering handle, torque is measured by detecting a magnetic field according to a difference between a rotational angle of the magnet coupled to the input shaft and a rotational angle of the stator coupled to the stator holder to rotate together with the output shaft. The assistant steering force is determined based on the measured torque and a motor is driven according to the assistant steering force.

DISCLOSURE OF INVENTION

Technical Problem

The embodiment provides a stator assembly and a torque measuring device.

The embodiment also provides a stator assembly, in which a stator can be strongly coupled to a stator holder, and a torque measuring device employing the stator assembly.

The embodiment provides a stator assembly, in which a stator can be easily coupled to a stator holder, and a torque measuring device employing the stator assembly.

Technical Solution

According to the embodiment, a stator assembly includes a stator holder, a first stator which includes a first body making contact with an upper end of the stator holder and a plurality of first teeth extending from the first body so as to be disposed inside the stator holder, a second stator which includes a second body making contact with a lower end of the stator holder and a plurality of second teeth extending from the second body so to be alternately aligned with the first teeth inside the stator holder, and a fusion-welded material that is fusion-welded to the stator holder and the first and second bodies.

According to the embodiment, a stator assembly includes a stator holder, a first stator which includes a first body making contact with an upper end of the stator holder, a plurality of first teeth extending from the first body so as to be disposed inside the stator holder, and a first coupling rim extending from the first body so as to be coupled to a first outer portion of the stator holder, and a second stator which includes a second body making contact with a lower end of the stator holder, a plurality of second teeth extending from the second body so to be alternately aligned with the first teeth inside the stator holder, and a second coupling rim extending from the second body so as to be coupled to a second outer portion of the stator holder.

According to the embodiment, a torque measuring device includes a case, a magnet disposed in the case, the magnet being coupled to an input shaft rotated by external force so as to be rotated, a stator assembly disposed in the case to surround the magnet, the stator assembly being coupled to an output shaft connected to the input shaft through a torsion bar so as to be rotated, and a sensor which detects variation of a magnetic field generated between the magnet and the stator assembly. The stator assembly includes a stator holder, a first stator which includes a first body making contact with an upper end of the stator holder and a plurality of first teeth extending from the first body so as to be disposed inside the stator holder, a second stator which includes a second body making contact with a lower end of the stator holder and a plurality of second teeth extending from the second body so as to be alternately aligned with the first teeth inside the stator holder, and a fusion-welded material that is fusion-welded to the stator holder and the first and second bodies.

According to the embodiment, a torque measuring device includes a case, a magnet disposed in the case, the magnet being coupled to an input shaft rotated by external force so as to be rotated, a stator assembly disposed in the case to surround the magnet, the stator assembly being coupled to an output shaft connected to the input shaft through a torsion bar so as to be rotated, and a sensor which detects variation of a magnetic field generated between the magnet and the stator assembly. The stator assembly includes a stator holder, a first stator which includes a first body making contact with an upper end of the stator holder, a plurality of first teeth extending from the first body so as to be disposed inside the stator holder, and a first coupling rim extending from the first body so as to be coupled to a first outside of the stator holder, and a second stator which includes a second body making contact with a lower end of the stator holder, a plurality of second teeth extending from the second body so as to be alternately aligned with the first teeth inside the stator holder, and a second coupling rim extending from the second body so as to be coupled to a second outside of the stator holder.

Advantageous Effects

According to the embodiments, a stator assembly and a torque measuring device can be provided.

According to the embodiments, a stator assembly, in which a stator is strongly coupled to a stator holder, and a torque measuring device employing the stator assembly can be provided.

According to the embodiments, a stator assembly, in which a stator is easily coupled to a stator holder, and a torque measuring device employing the stator assembly can be provided.

MODE FOR THE INVENTION

Hereinafter, a stator assembly and a torque measuring device according to embodiments will be described with reference to accompanying drawings.

Hereinafter, details about a stator assembly and a torque measuring device adaptable for a power steering system for a vehicle will be made according to the embodiments.

First Embodiment

Figure 1:
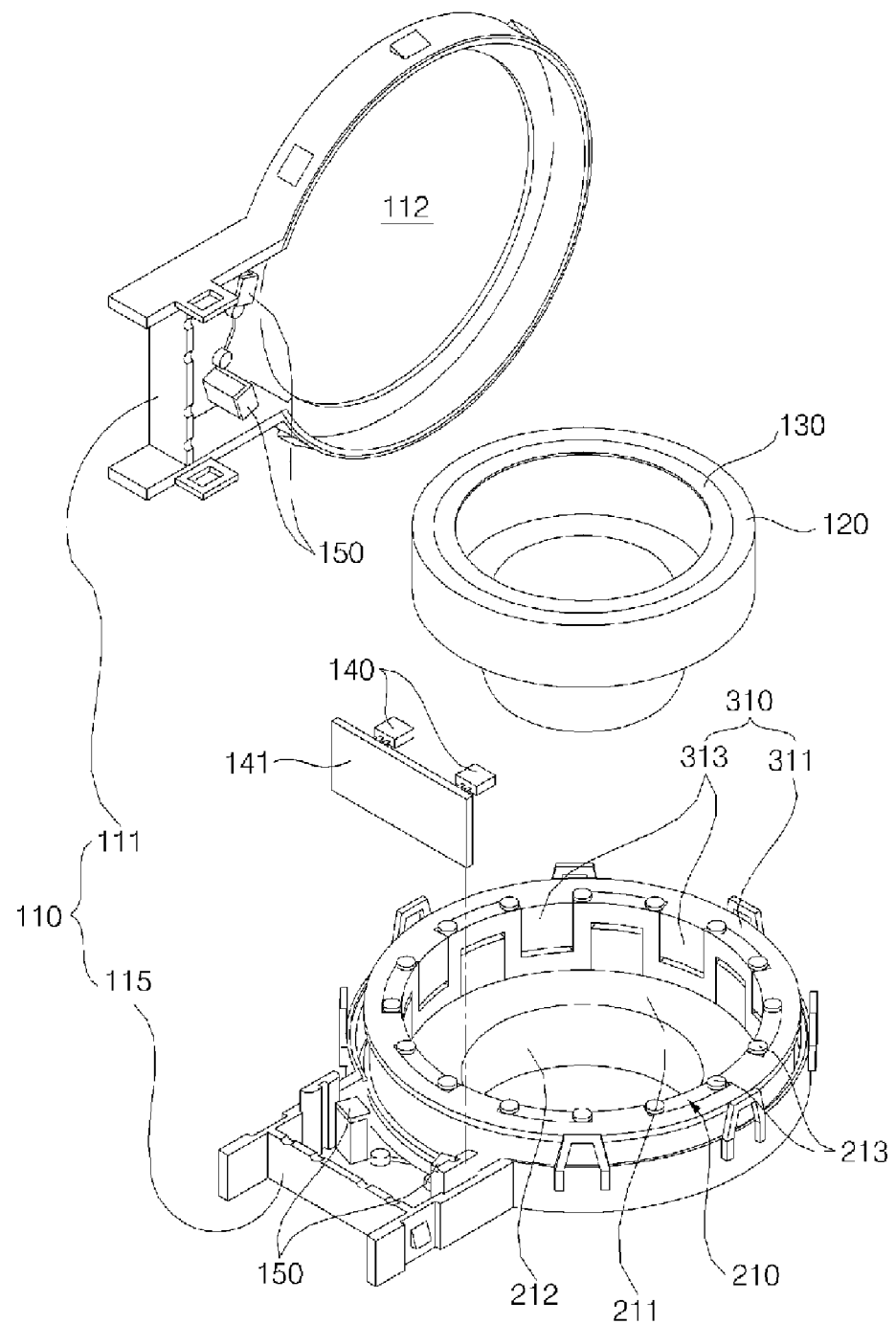
FIGS. 1 and 2 are views showing a stator assembly and a torque measuring device according to a first embodiment.

FIG. 1 is a perspective view showing a stator assembly and a torque measuring device according to a first embodiment.

As shown in FIG. 1, a case 110 is prepared with a predetermined inner space. The case 110 includes an upper case 111 and a lower case 115, in which the upper case 111 is provided at an upper portion of a virtual vertical line, and the lower case 115 is provided at a lower portion of the virtual vertical line. The upper case 111 is formed at a central portion thereof with a through hole 112, and the lower case 110 is formed at a central portion thereof with a through hole (not shown) corresponding to the through hole 112.

Hereinafter, a surface facing an upper portion of the virtual vertical line will be referred to as a top surface, and a surface facing a lower portion of the virtual vertical line will be referred to as a bottom surface.

A stator holder 210 having a cylindrical shape is installed on the lower case 115, and stators 310 are coupled to upper and lower ends of the stator holder 210.

The stator 310 is provided at an inside thereof with a magnet 120 having a ring shape, which has a plurality of polarities radially aligned. The magnet 120 is provided at an inside thereof with a magnet holder 130. The magnet 120 has an inner circumferential surface coupled with an outer circumferential surface of the magnet holder 130 having a cylindrical shape, and the outer circumferential surface of the magnet 120 faces teeth 313 of the stator 310, which will be described later, with a predetermined interval.

An input shaft (not shown), which is a steering shaft penetrating the through hole 112 of the upper case 111, is fitted into the inner circumferential surface of the magnet holder 130, and an output shaft (not shown) linked with a front wheel of a vehicle, which is a steering wheel, is fitted into the stator holder 210.

In detail, the stator holder 210 is formed with a connection part 211 having a ring shape which extends radially inward. The connection part 211 is formed with an insertion hole 212. The output shaft (not shown) linked with the front wheel of the vehicle (which is the steering wheel) is inserted into the insertion hole 212 while penetrating the through hole of the lower case 115. A steering handle is coupled to the input shaft, and the input shaft is coupled to the output shaft through a torsion bar (not shown).

Therefore, when rotating the steering handle by applying an external force to the steering handle, the input shaft is rotated, and the magnet holder 130 and the magnet 120 are rotated similarly to the input shaft. Then, the output shaft receives a rotational force of the input shaft through the torsion bar to rotate, and the stator holder 210 and the stator 310 rotate similarly to the output shaft.

However, since the output shaft is coupled to the front wheel in the contact with a road, torque occurs in the torsion bar due to frictional resistance between the road and the front wheel. The magnet 120 rotates at a rotational angle different from that of the stator 310 due to the torque of the torsion bar, a magnetic field between the magnet 120 and the stator 310 varies due to difference between rotational angles of the magnet 120 and the stator.

The magnetic field generated from the magnet 120 and the stator 310 is detected by a sensor 140 supported on a circuit board 141 of the lower case 115. Accordingly, a controller (not shown) receives the intensity of the magnetic field detected by the sensor 140 and compares the received intensity of the magnetic field with a preset value to measure the torque. Then, the controller determines assistant steering force required to steer a vehicle based on the measured torque and drive a motor to provide the assistant steering force.

A reference number 150 which is not described represents a collector to concentrate a magnetic field such that the sensor 140 can effectively detect the intensity of the magnetic field.

Meanwhile, in order to exactly measure a magnetic field, the stator 310 coupled to the stator holder 210 must not move on the stator holder 210.

Figure 2:
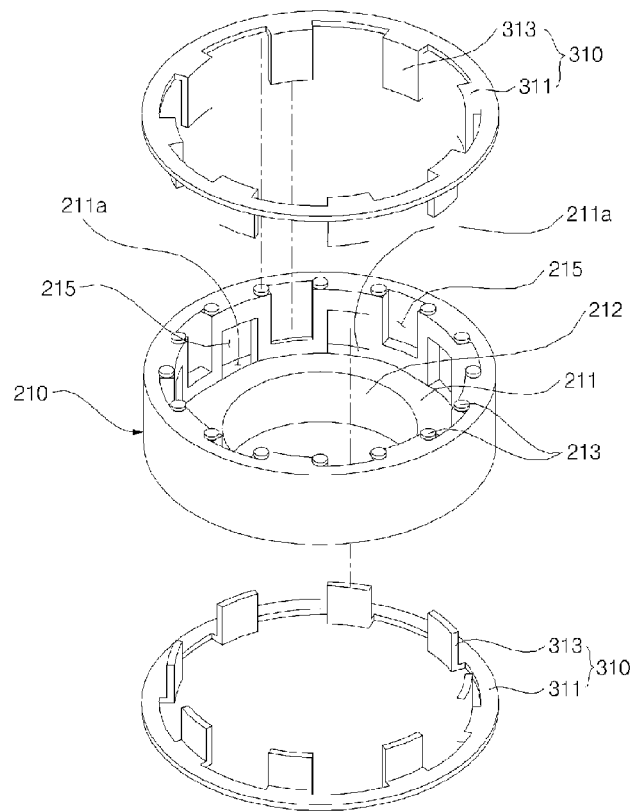

In the torque measuring device according to the present embodiment, the stator 310 is directly coupled to the stator holder 210 with solidity. This will described later with reference to FIGS. 1 and 2. FIG. 2 is a perspective view showing the stator 310 and the stator holder 210 shown in FIG. 1.

As shown in FIG. 2, the stator holder 210 has a cylindrical shape, and is provided at a lower end thereof with the connection part 211 and the insertion hole 212. The output shaft is inserted into the insertion hole 212.

The stators 310 include bodies 311 having a ring shape and a plurality of teeth 313 which are bent from the inner circumferential surface of the bodies 311 and spaced apart from each other by a predetermined interval. The bodies 311 of the stators 310 make contact with upper and lower ends of the stator holder 210. The teeth 313 are provided into the stator holder 210 to make contact with an inner circumferential surface of the stator holder 210.

The teeth 313 of the stator 310 coupled to an upper portion of the stator holder 210 are alternately aligned with the teeth 313 of the stator 310 coupled to a lower portion of the stator holder 210.

The teeth 313 of the stator 310 coupled to the lower portion of the stator holder 210 penetrate a communication hole 211a formed in the connection part 211 such that the teeth 313 are provided inside the stator holder 210. The teeth 313 face the outer circumferential surface of the magnet 120.

In order to couple the stator 310 to the stator holder 210, a plurality of protrusions 213 that can be fusion-welded by heat or an ultrasonic wave are formed on the upper and lower ends of the stator holder 210 with a predetermined interval. The protrusion 213 makes contact with both side surface of each tooth 313 of the stator 310. In detail, after inserting the stator 310 into the stator holder 210 such that the protrusion 213 makes contact with both side surface of each tooth 313 of the stator 310, the protrusion 213 is fused by heat or an ultrasonic wave. Accordingly, since a portion of the fused protrusion 213 covers the tooth 313, the stator 310 is strongly fusion-welded to the stator holder 210.

A plurality of partition grooves 215 are formed on the inner circumferential surface of the stator holder 210 to guide the teeth 313 such that the teeth 313 are provided with a predetermined interval. In contrast, protrusion guides (not shown) may be formed on the inner circumferential surface of the stator holder 210 instead of the partition grooves 215.

Second Embodiment to Seven Embodiment

FIGS. 3 to 8 are perspective views showing stators and stator holders of stator assemblies according to second to seventh embodiments. Hereinafter, only difference between the first embodiment and the second to seventh embodiments will be described in order to avoid redundancy.

Figure 3:
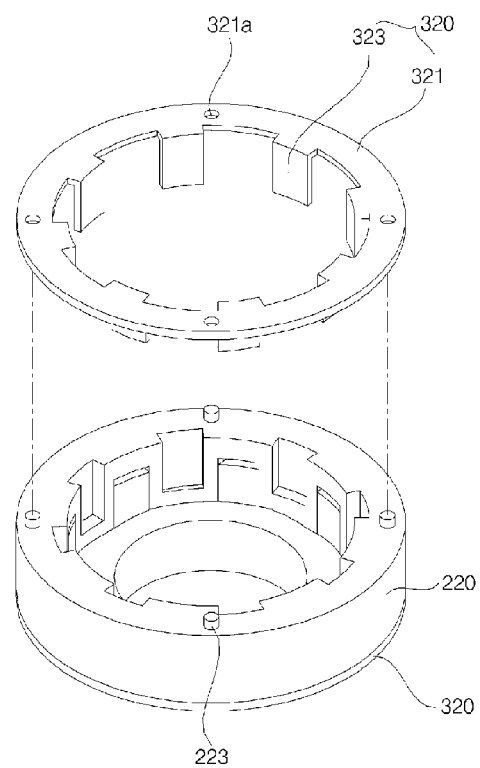
FIG. 3 is a view showing a stator assembly and a torque measuring device according to a second embodiment.

As shown in FIG. 3, in a torque measuring device according to the second embodiment, stators 320 have bodies 321 formed thereon with coupling holes 321a, and a stator holder 220 is formed on upper and lower ends thereof with a plurality of protrusions 223 which are inserted into the coupling holes 321a and fused by heat or a ultrasonic wave. The protrusions 223 are fused by heat or an ultrasonic wave, and a fused portion of the protrusions 223 cover the body 321 so that the body 321 is fusion-welded to the stator holder 220.

Figure 4:
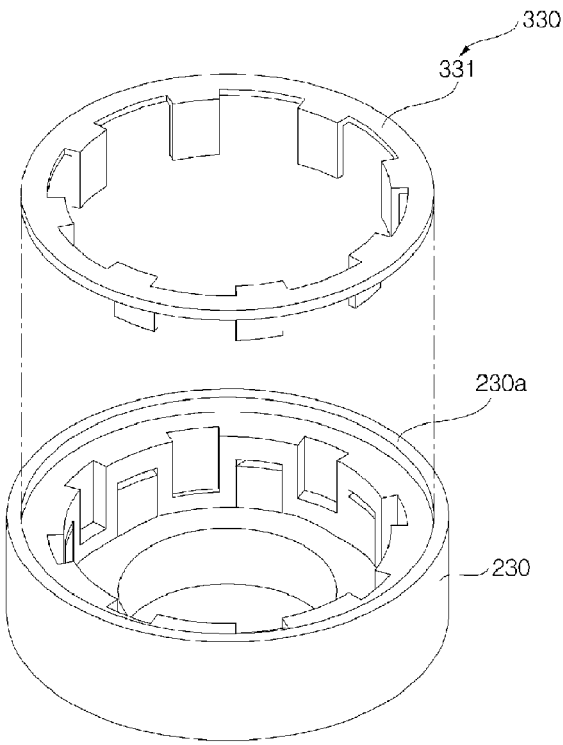
FIG. 4 is a view showing a stator assembly and a torque measuring device according to a third embodiment.

As shown in FIG. 4, in a torque measuring device according to the third embodiment, protrusion parts 230a protrude from outer peripheral surfaces of upper and lower ends of a stator holder 230.

The protrusion 230a has a ring shape. The protrusion 230a includes the same material as that of the stator holder 230, and is integrally formed with the stator holder 230. In other words, the protrusion part 230a is injection-molded together with the stator holder 230 when the stator holder 230 is injection-molded.

Bodies 331 of stators 330 are mounted on the upper and lower ends of the stator holder 230, and an outer circumferential surface of the body 331 of the stator 330 makes contact with an inner circumferential surface of the protrusion part 230a. In addition, the protrusion part 230a has a height greater than thickness of the body 331 of the stator 330.

Heat or an ultrasonic wave is applied to the protrusion part 230a such that the protrusion part 230a is fused. Accordingly, a fused portion of the protrusion part 230a covers the body 321 of the stator 330 so that the body 321 is fusion-welded with the stator holder 220.

Figure 5:
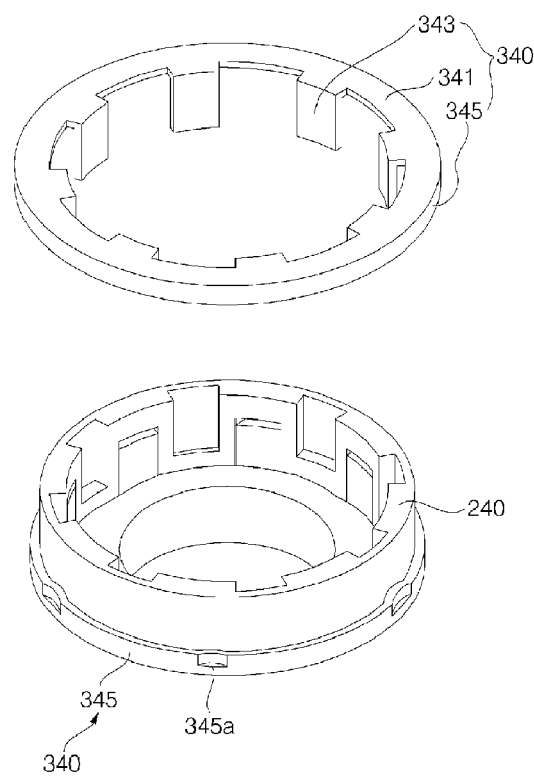
FIG. 5 is a view showing a stator assembly and a torque measuring device according to a fourth embodiment.

As shown in FIG. 5, a torque measuring device according to the fourth embodiment includes stators 340, bodies 341 making contact with upper and lower ends of a stator holder 240, a plurality of teeth 343 bent from an inner circumferential surface of each body 341, and a coupling rim 345 bent from an outer circumferential surface of the body 341 to face an outer circumferential surface of the stator holder 240. The coupling rim 345 includes a plurality of caulking parts 345a so that the coupling rim 345 is coupled to the outer circumferential surface of the stator holder 240. Accordingly, the stator 340 is strongly coupled to the stator holder 240.

Figure 6:
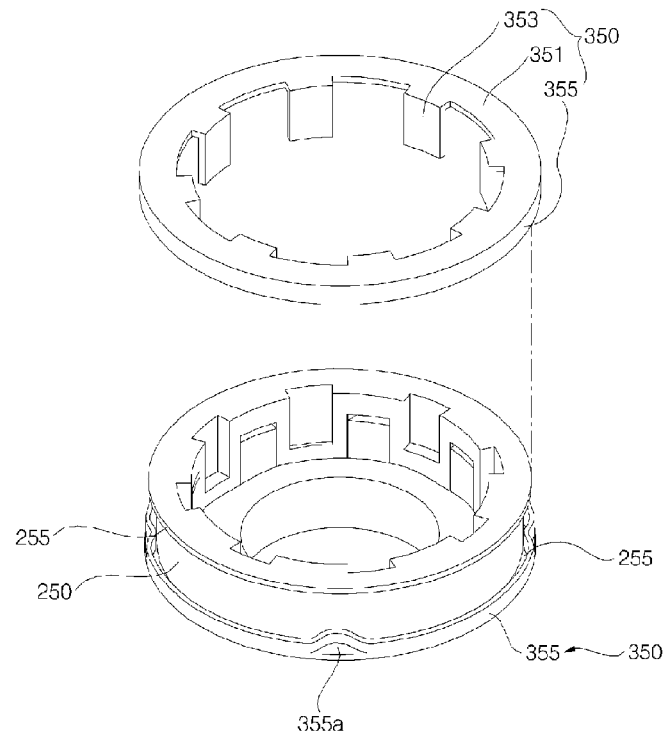
FIG. 6 is a view showing a stator assembly and a torque measuring device according to a fifth embodiment.

As shown in FIG. 6, in a torque measuring device according to the fifth embodiment, a stator holder 250 includes protrusion rims 255 formed on outer peripheral surfaces of upper and lower ends of the stator holder 250.

Similarly to the stator 340 according to the fourth embodiment, stators 350 include bodies 351, teeth 353, and coupling rims 355. The bodies 351 make contact with the protrusion rims 255 as well as the upper and lower ends of the stator holder 250. In addition, the coupling rim 355 faces an outer circumferential surface of the protrusion rim 255, and includes a plurality of caulking parts 355a to couple to the protrusion rim 255.

In this case, the coupling rim 355 has a width larger than a thickness of the protrusion rim 255.

Figure 7:
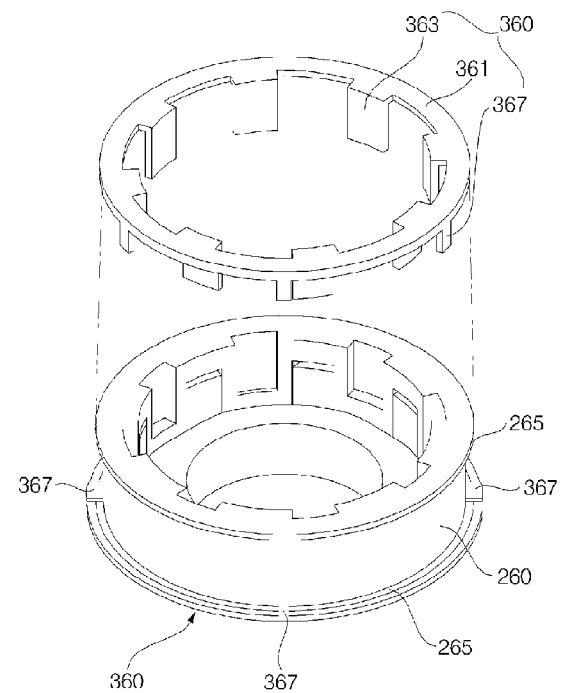
FIG. 7 is a view showing a stator assembly and a torque measuring device according to a sixth embodiment.

As shown in FIG. 7, a torque measuring device according to the six embodiment includes a stator holder 260 having the same structure as that of the stator holder 250 according to the fifth embodiment.

Stators 360 include bodies 361, which make contact with protrusion rims 265, as well as upper and lower ends of the stator holder 260, a plurality of teeth 363 bent from an inner circumferential surface of each body 361, and a plurality of coupling protrusions 367 protruding from an outer peripheral surface of the bodies 361. The coupling protrusion 367 is bent to couple to the protrusion rim 265, so that the stator 360 is coupled to the stator holder 260.

In this case, the coupling protrusion 367 may be formed by partially dividing the coupling rim 345 shown in FIG. 5 along an outer circumference of the body 341.

Figure 8:
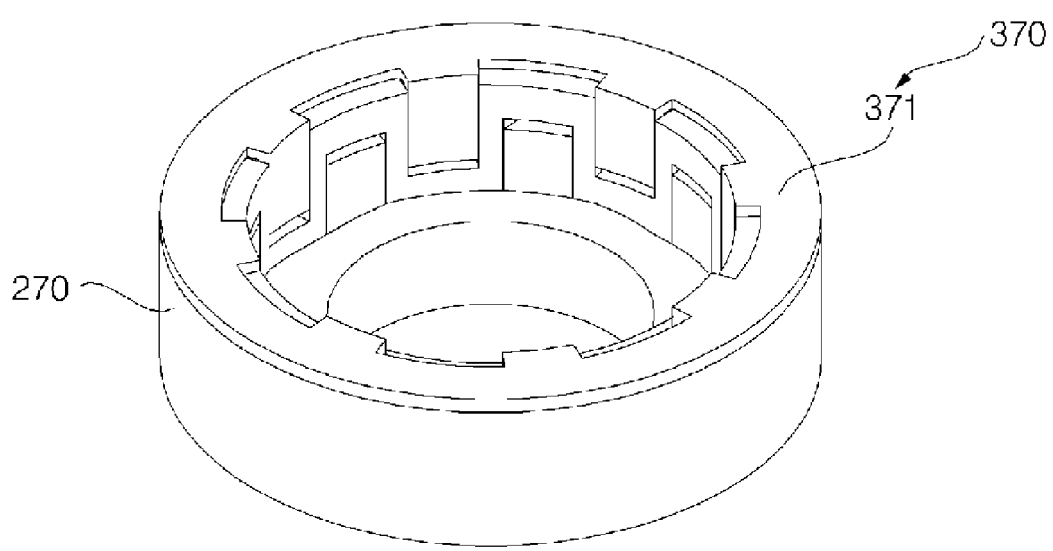
FIG. 8 is a view showing a stator assembly and a torque measuring device according to a seventh embodiment.

As shown in FIG. 8, in a torque measuring device according to the seventh embodiment, a stator holder 270 has a cylindrical shape, and stators 370 have bodies 371 fixed onto upper and lower ends of the stator holder 270 by an adhesive.

In addition, in a torque measuring device according to another embodiment, the stator 370 having a shape according to the seventh embodiment may be integrally formed with the stator holder 270 when injection-molding the stator holder 270.

As described above, in the torque measuring device according to the embodiments, a stator is directly coupled to a stator holder by a protrusion of the fusion-welded stator, a portion of the fusion-welded stator holder, a caulked portion of the stator, or a bent portion of the stator. Accordingly, an additional part to couple the stator to the stator holder is not required, so that the manufacturing cost is reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The present invention is adaptable for a torque measuring device.

The invention claimed is:
1. A stator assembly comprising:
a stator holder;
a first stator which includes a first body making contact with an upper end of the stator holder and a plurality of first teeth extending from the first body so as to be disposed inside the stator holder;
a second stator which includes a second body making contact with a lower end of the stator holder and a plurality of second teeth extending from the second body so as to be alternately aligned with the first teeth inside the stator holder; and a fusion-welded material that is fusion-welded to the stator holder and the first and second bodies, wherein the stator holder has a cylindrical shape, and the first and second teeth make contact with an inner circumferential surface of the stator holder, and wherein the stator holder is provided at the inner circumferential surface thereof with spaces, and each of the first and second teeth is separately inserted into each of the spaces.

2. The stator assembly of claim 1, wherein the fusion-welded material is fused by heat or an ultrasonic wave.

3. The stator assembly of claim 1, wherein the first and second bodies have widths narrower than widths of the upper and lower ends of the stator holder, respectively, and the fusion-welded material is disposed at a border area between the first body and the upper end of the stator holder, and at a border area between the second body and the lower end of the stator holder.

4. The stator assembly of claim 1, wherein the first and second bodies have a coupling hole, and the fusion-welded material is disposed to the first and second bodies and the upper and lower ends of the stator holder through the coupling hole.

5. The stator assembly of claim 1, wherein the stator holder is provided with a protrusion having a ring shape which protrudes from an outer peripheral surface of the upper and lower ends of the stator holder, the first and second bodies make contact with an inner circumferential surface of the protrusion, and the fusion-welded material is formed by fusing the protrusion.

6. The stator assembly of claim 5, wherein the protrusion has a material identical to a material of the stator holder, and is integrally formed with the stator holder.

7. A stator assembly comprising:

a stator holder;

a first stator which includes a first body making contact with an upper end of the stator holder, a plurality of first teeth extending from the first body so as to be disposed inside the stator holder, and a first coupling rim extending from the first body so as to be coupled to a first outer portion of the stator holder; and a second stator which includes a second body making contact with a lower end of the stator holder, a plurality of second teeth extending from the second body so as to be alternately aligned with the first teeth inside the stator holder, and a second coupling rim extending from the second body so as to be coupled to a second outer portion of the stator holder, wherein the stator holder has a cylindrical shape, and the first and second teeth make contact with an inner circumferential surface of the stator holder, and wherein the stator holder is provided at the inner circumferential surface thereof with spaces, and each of the first and second teeth is separately inserted into each of the spaces.

8. The stator assembly of claim 7, wherein the first coupling rim makes contact with an outer circumferential surface of the stator holder, and the second coupling rim makes contact with the outer circumferential surface of the stator holder.

9. The stator assembly of claim 8, wherein the first and second coupling rims are caulked so as to be coupled to the stator holder.

10. The stator assembly of claim 8, wherein the upper end of the stator holder has a first protrusion rim protruding radially outward, the lower end of the stator holder has a second protrusion rim protruding radially outward, the first coupling rim is calked so as to be coupled to the first protrusion rim, and the second coupling rim is calked so as to be coupled to the second protrusion rim.

11. The stator assembly of claim 8, wherein the upper end of the stator holder has a first protrusion rim protruding radially outward, the lower end of the stator holder has a second protrusion rim protruding radially outward, the first coupling rim is bent so as to be coupled to the first protrusion rim, and the second coupling rim is bent so as to be coupled to the second protrusion rim.

12. A torque measuring device comprising:

a case:

a magnet disposed in the case, the magnet being coupled to an input shaft rotated by external force so as to be rotated;

a stator assembly disposed in the case to surround the magnet, the stator assembly being coupled to an output shaft connected to the input shaft through a torsion bar so as to be rotated; and a sensor which detects variation of a magnetic field generated between the magnet and the stator assembly, wherein the stator assembly includes:

a stator holder;

a first stator which includes a first body making contact with an upper end of the stator holder and a plurality of first teeth extending from the first body so as to be disposed inside the stator holder;

a second stator which includes a second body making contact with a lower end of the stator holder and a plurality of second teeth extending from the second body so as to be alternately aligned with the first teeth inside the stator holder; and a fusion-welded material that is fusion-welded to the stator holder and the first and second bodies, wherein the stator holder has a cylindrical shape, and the first and second teeth make contact with an inner circumferential surface of the stator holder, and wherein the stator holder is provided at the inner circumferential surface thereof with spaces, and each of the first and second teeth is separately inserted into each of the spaces.

13. A torque measuring device comprising:

a case:

a magnet disposed in the case, the magnet being coupled to an input shaft rotated by external force so as to be rotated;

a stator assembly disposed in the case to surround the magnet, the stator assembly being coupled to an output shaft connected to the input shaft through a torsion bar so as to be rotated; and a sensor which detects variation of a magnetic field generated between the magnet and the stator assembly, wherein the stator assembly includes:

a stator holder;

a first stator which includes a first body making contact with an upper end of the stator holder, a plurality of first teeth extending from the first body so as to be disposed inside the stator holder, and a first coupling rim extending from the first body so as to be coupled to a first outside of the stator holder; and a second stator which includes a second body making contact with a lower end of the stator holder, a plurality of second teeth extending from the second body so as to be alternately aligned with the first teeth inside the stator holder, and a second coupling rim extending from the second body so as to be coupled to a second outside of the stator holder,
wherein the stator holder has a cylindrical shape, and the first and second teeth make contact with an inner circumferential surface of the stator holder, and
wherein the stator holder is provided at the inner circumferential surface thereof with spaces, and each of the first and second teeth is separately inserted into each of the spaces.

* * * * *